(12) United States Patent
Sawai et al.

(10) Patent No.: US 11,597,166 B2
(45) Date of Patent: Mar. 7, 2023

(54) METHOD OF MANUFACTURING HIGH-PRESSURE TANK

(71) Applicant: TOYOTA JIDOSHA KABUSHIKI KAISHA, Aichi-ken (JP)

(72) Inventors: Osamu Sawai, Okazaki (JP); Soichiro Matsui, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 658 days.

(21) Appl. No.: 16/664,943

(22) Filed: Oct. 28, 2019

(65) Prior Publication Data

US 2020/0171761 A1 Jun. 4, 2020

(30) Foreign Application Priority Data

Nov. 29, 2018 (JP) .............................. JP2018-224178

(51) Int. Cl.
| | | |
|---|---|---|
| *B29C 70/16* | (2006.01) | |
| *B60K 15/03* | (2006.01) | |
| *B29D 22/00* | (2006.01) | |
| *B29C 70/30* | (2006.01) | |
| *B60K 15/04* | (2006.01) | |

(52) U.S. Cl.
CPC .............. *B29C 70/16* (2013.01); *B29C 70/30* (2013.01); *B29D 22/003* (2013.01); *B60K 15/03* (2013.01); *B60K 2015/03046* (2013.01); *B60K 2015/047* (2013.01)

(58) Field of Classification Search
CPC .... B60K 2015/03046; B60K 2015/047; B29C 70/16; B29C 70/30
See application file for complete search history.

(56) References Cited

U.S. PATENT DOCUMENTS 3,480,498 A * 11/1969 Paul, Jr. ................. B29C 53/56
427/430.1
8,313,595 B2 11/2012 Blanc et al.
(Continued)

FOREIGN PATENT DOCUMENTS

| CN | 1463343 A | 12/2003 |
|---|---|---|
| CN | 1609500 A | 4/2005 |

(Continued)

OTHER PUBLICATIONS

Machine Translation of Japanese Patent 2007-125844, Date Unknown.*
(Continued)

*Primary Examiner* — Jeffry H Aftergut
(74) *Attorney, Agent, or Firm* — Hauptman Ham, LLP

(57) ABSTRACT

A method of manufacturing a high-pressure tank includes: forming a vessel body including a body portion having a cylindrical shape, a domical portion having a hemispherical shape and provided at an end of the body portion, and a neck portion extending from the domical portion in an axial direction of the domical portion; winding fibers around an outer peripheral surface of the vessel body to form a plurality of fiber layers laminated in a radial direction of the vessel body; and placing, in a mold, the vessel body around which the fibers have been wound, and then injecting a resin onto the neck portion in an axial direction of the vessel body to impregnate the fibers with the resin.

6 Claims, 4 Drawing Sheets

(56) References Cited

U.S. PATENT DOCUMENTS

| | | |
|---|---|---|
| 2004/0206762 A1 | 10/2004 | Iida et al. |
| 2005/0087537 A1 | 4/2005 | Kimbara et al. |
| 2009/0071930 A1 | 3/2009 | Sato et al. |
| 2014/0014667 A1 | 1/2014 | Flammer |
| 2015/0316209 A1* | 11/2015 | Nettis ...................... F17C 1/14 242/438 |
| 2019/0086029 A1 | 3/2019 | Wada et al. |

FOREIGN PATENT DOCUMENTS

| | | |
|---|---|---|
| CN | 101382235 A | 3/2009 |
| DE | 69530126 T2 | 12/2003 |
| DE | 102014009341 A1 | 12/2015 |
| EP | 0503142 A1 | 9/1992 |
| EP | 1571389 A1 | 9/2005 |
| JP | 2005-511363 A | 4/2005 |
| JP | 2007-125844 A * | 5/2007 |
| JP | 2007125844 A | 5/2007 |
| JP | 2009-255472 A * | 11/2009 |
| JP | 2012-52588 A | 3/2012 |
| TW | 200640658 A | 12/2006 |
| WO | 02093068 A1 | 11/2002 |
| WO | 03/051603 A1 | 6/2003 |
| WO | 2017150520 A1 | 9/2017 |

OTHER PUBLICATIONS

Machine Translation of Japanese Patent 2009-255472, Date Unknown.*

* cited by examiner

METHOD OF MANUFACTURING HIGH-PRESSURE TANK

INCORPORATION BY REFERENCE

The disclosure of Japanese Patent Application No. 2018-224178 filed on Nov. 29, 2018 including the specification, drawings and abstract is incorporated herein by reference in its entirety.

BACKGROUND

1. Technical Field

The present disclosure relates to a method of manufacturing a high-pressure tank.

2. Description of Related Art

Japanese Unexamined Patent Application Publication No. 2012-052588 (JP 2012-052588 A) discloses a method of manufacturing a pressure vessel by winding fibers around a vessel body and then impregnating the fibers with a resin. According to the method disclosed in JP 2012-052588 A, the diameter of the vessel body around which the fibers have been wound is increased, and, in this state, the vessel body is covered with a vacuum film and then the fibers are impregnated with the resin.

SUMMARY

In the related art described above, fibers are wound around an outer peripheral surface of the vessel body, so that multiple fibers are laminated in a radial direction of the vessel body to form fiber layers. Therefore, there is still room for improvement in terms of evenly impregnating fibers with a resin.

The present disclosure provides a method of manufacturing a high-pressure tank, the method allowing fibers to be evenly impregnated with a resin.

An aspect of the disclosure relates to a method of manufacturing a high-pressure tank. The method includes: forming a vessel body including a body portion having a cylindrical shape, a domical portion having a hemispherical shape and provided at an end of the body portion, and a neck portion extending from the domical portion in an axial direction of the domical portion; winding fibers around an outer peripheral surface of the vessel body to form a plurality of fiber layers laminated in a radial direction of the vessel body; and placing, in a mold, the vessel body around which the fibers have been wound, and then injecting a resin onto the neck portion in an axial direction of the vessel body to impregnate the fibers with the resin.

With the method of manufacturing the high-pressure tank according to the above aspect, a fiber-reinforced resin layer is formed on the outer peripheral surface of the vessel body. As a result, the vessel body is reinforced by the fiber-reinforced resin layer.

The resin is injected onto the neck portion of the vessel body in the axial direction of the vessel body. In this way, even when multiple fiber layers are formed so as to be laminated in the radial direction of the vessel body, it is possible to impregnate inner layers, which are provided close to the vessel body, with the resin.

In the above aspect, the fibers may be wound around the outer peripheral surface of the vessel body such that a total thickness of the plurality of fiber layers is greater on the neck portion than on each of the body portion and the domical portion.

Thus, the pressure capacity of the neck portion of the high-pressure tank is increased. Further, even when the total thickness of the plurality of fiber layers is increased on the neck portion, it is possible to effectively impregnate the fibers with the resin.

The method of manufacturing the high-pressure tank according to the above aspect may include assembling a cap to the neck portion, and assembling, to the cap, a connecting member configured to connect a plurality of the high-pressure tanks to each other. The connecting member may include a through-hole that extends through the connecting member in the axial direction of the vessel body such that the through-hole overlaps with the plurality of fiber layers as viewed in the axial direction of the vessel body when the connecting member has been assembled to the cap. The resin may be injected through the through-hole of the connecting member.

In the case where the resin is injected through the through-hole, it is possible to reliably inject the resin into the fiber layers in the axial direction of the vessel body, as compared with a case where a mold itself includes a through-hole for resin injection. For example, the amount of resin to be injected can be adjusted just by changing the shape or hole diameter of the through-hole. Therefore, it is no longer necessary to change the design of the mold in order to adjust the amount of resin to be injected.

In the above aspect, a resin injection unit may be disposed on one side of the mold in the axial direction of the vessel body, and a vacuum pump may be disposed on the other side of the mold in the axial direction of the vessel body and the vacuum pump may be connected to the mold. Further, the mold may be depressurized by the vacuum pump while the resin is injected from the resin injection unit into the mold.

The mold is depressurized by the vacuum pump. Thus, bubbles in the resin are removed. As a result, it is possible to reduce generation of voids.

As described above, the method of manufacturing the high-pressure tank according to the present disclosure allows fibers to be evenly impregnated with a resin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 2:
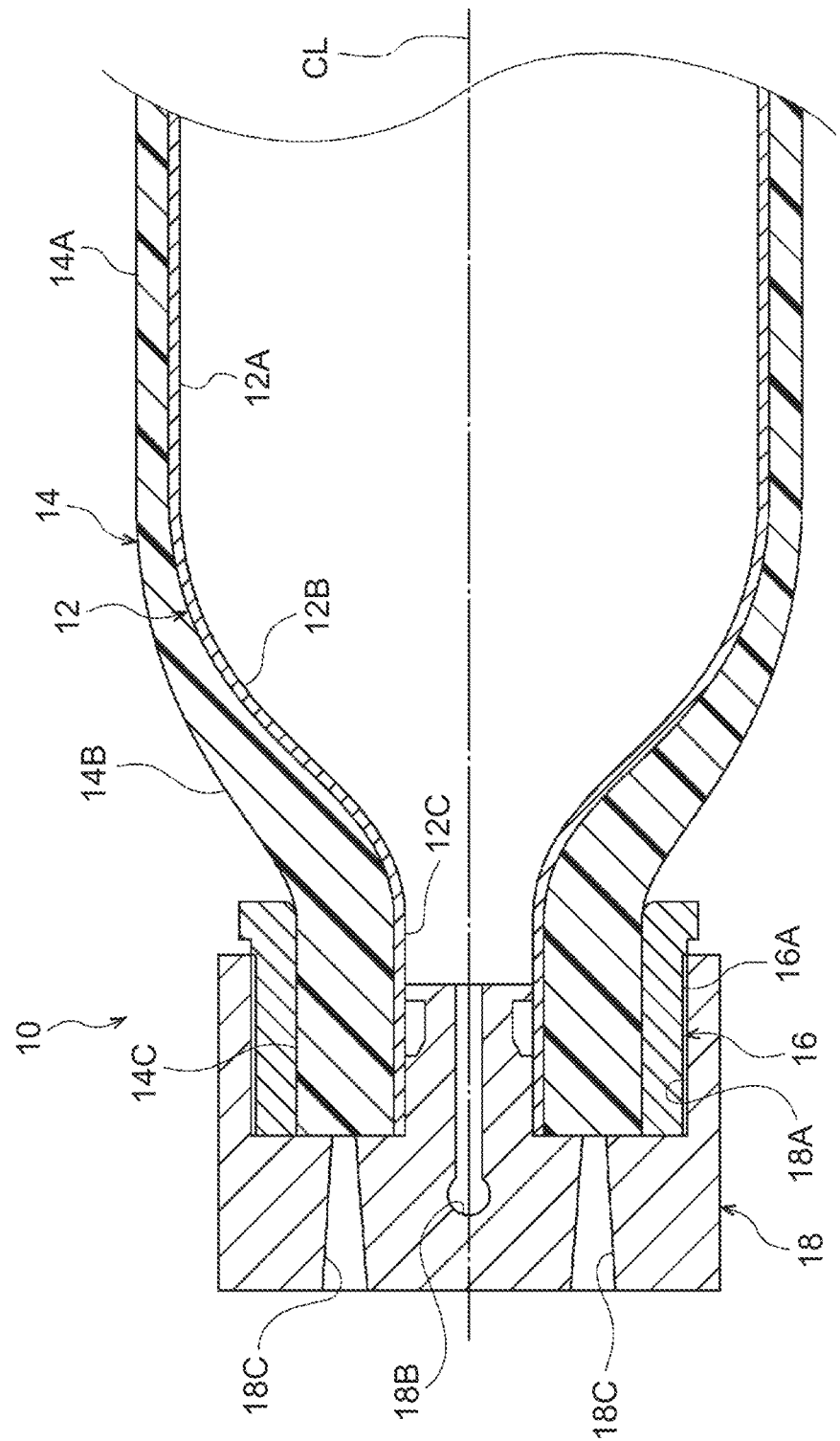
FIG. 2 is an enlarged view of a high-pressure tank according to the embodiment.
Figure 3:
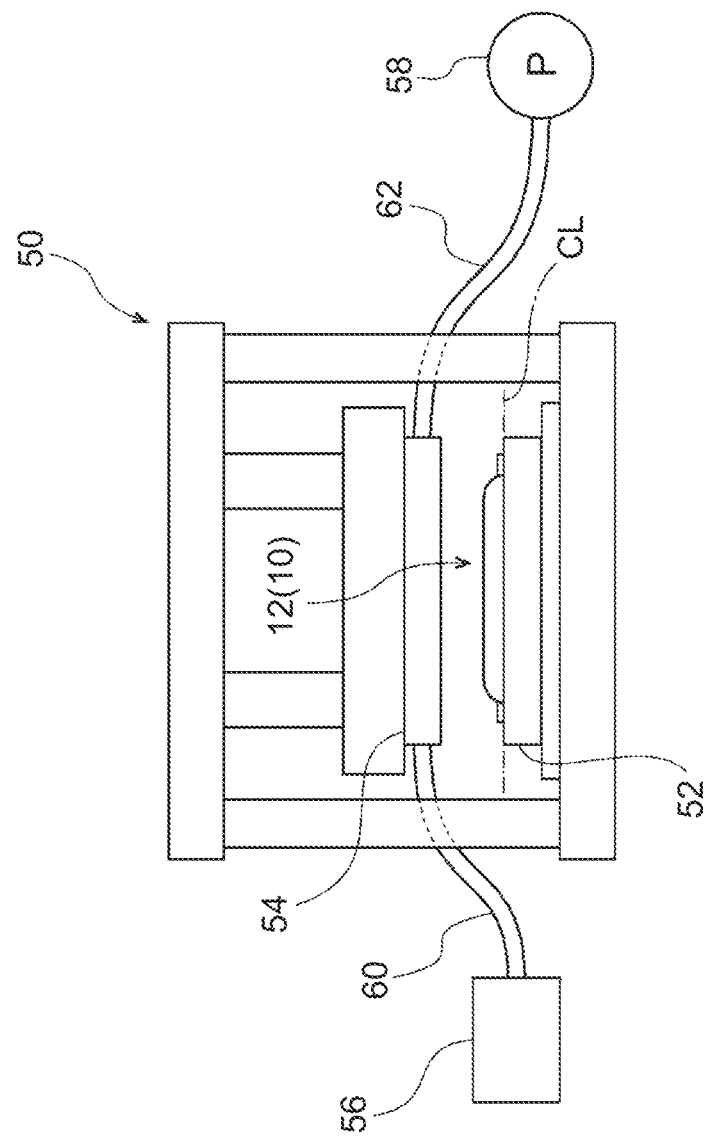
FIG. 3 is an overall configuration diagram illustrating an injection step according to the embodiment.
Figure 4:
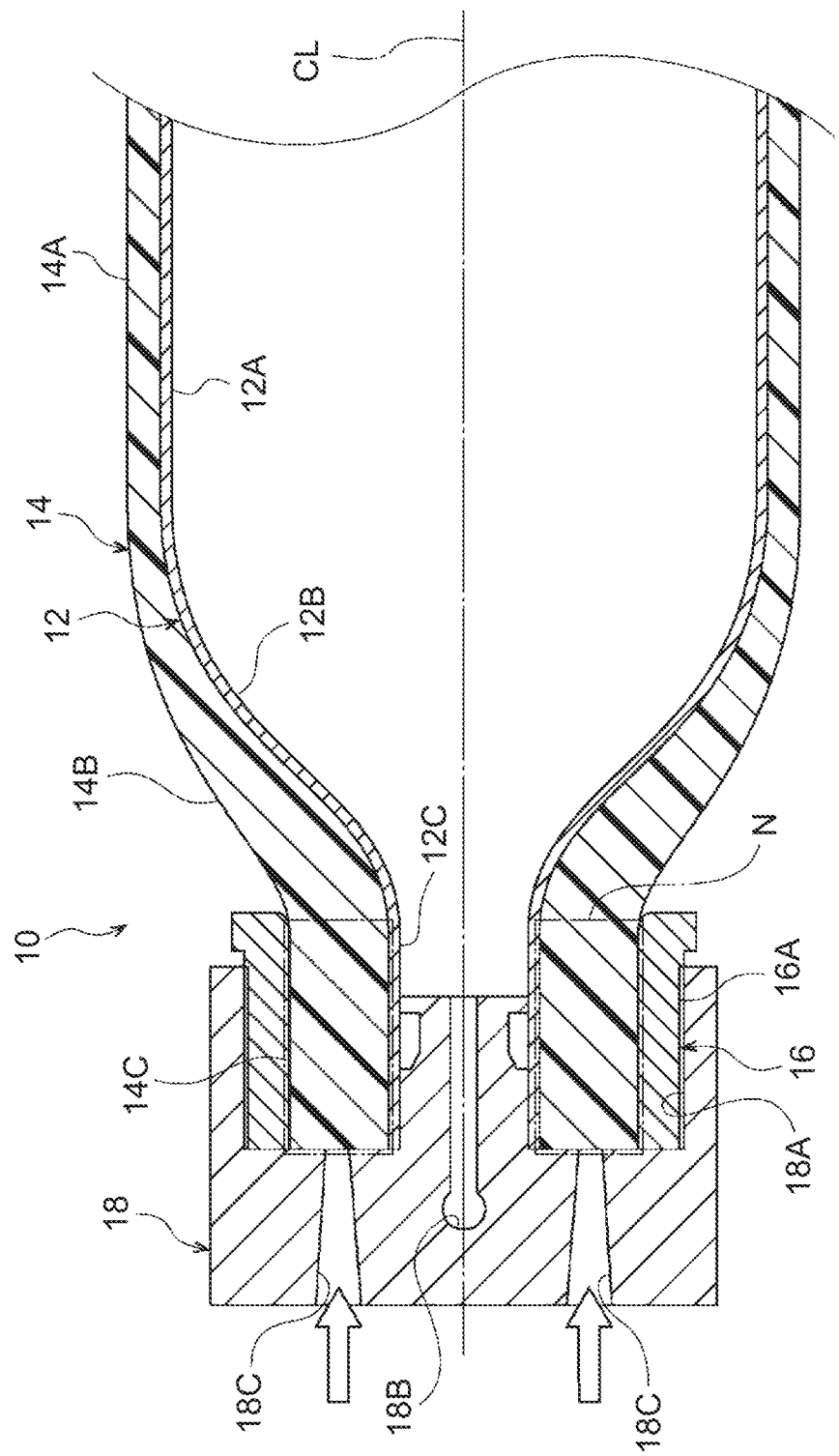
FIG. 4 is an enlarged view of the high-pressure tank, illustrating the injection step according to the embodiment.

First, a high-pressure tank 10 according to an embodiment will be described with reference to the accompanying drawings, and then a method of manufacturing the high-pressure tank 10 will be described. Note that a long dashed short dashed line CL illustrated in FIG. 2 to FIG. 4 represents a central axis of the high-pressure tank 10. In the following description, "axial direction" means a direction along the central axis CL, and "radial direction" means a direction along a radial direction of the high-pressure tank 10, unless otherwise noted. Note that, an axial direction of a vessel body 12, which will be described later, coincides with the direction along the central axis CL.

Overall Configuration of High-Pressure Tank

As illustrated in FIG. 2, the high-pressure tank 10 of the present embodiment is a pressure vessel used as a hydrogen tank to be mounted in a fuel-cell vehicle. Main components of the high-pressure tank 10 include the vessel body 12, a fiber-reinforced resin layer 14, a cap 16, and a connecting member 18. The vessel body 12 includes a body portion 12A, a domical portion 12B, and a neck portion 12C. In the present embodiment, the vessel body 12 is made of an aluminum alloy, which is an example of a material of the vessel body 12. However, the material of the vessel body 12 is not limited to an aluminum alloy. The vessel body 12 may be made of, for example, a reinforced resin.

The body portion 12A of the vessel body 12 has a generally cylindrical shape, and extends in the axial direction. That is, the longitudinal direction of the body portion 12A of the vessel body 12 coincides with the axial direction. The domical portions 12B are provided respectively at opposite ends of the body portion 12A in the axial direction such that the domical portions 12B are integral with the body portion 12A. Each domical portion 12B has a generally hemispherical shape.

The neck portion 12C extends in an axial direction of the domical portion 12B from an end of the domical portion 12B. The end of the domical portion 12B, from which the neck portion 12C extends, is on the opposite side of the domical portion 12B from the body portion 12A. The axial direction of the domical portion 12B coincides with the direction along the central axis CL. The neck portion 12C is smaller in diameter than the body portion 12A. The neck portion 12C extends such that the diameter of the neck portion 12C is constant in the axial direction.

The fiber-reinforced resin layer 14 is disposed on an outer peripheral surface of the vessel body 12. In other words, the vessel body 12 is covered with the fiber-reinforced resin layer 14, so that the vessel body 12 is reinforced by the fiber-reinforced resin layer 14.

The fiber-reinforced resin layer 14 includes a first reinforcing layer 14A covering an outer peripheral surface of the body portion 12A, a second reinforcing layer 14B covering an outer peripheral surface of the domical portion 12B, and a third reinforcing layer 14C covering an outer peripheral surface of the neck portion 12C. The fiber-reinforced resin layer 14 of the present embodiment is made of carbon fiber reinforced plastic (CFRP). The thickness of the third reinforcing layer 14C in the radial direction is greater than the thickness of the first reinforcing layer 14A in the radial direction. The thickness of the second reinforcing layer 14B in the radial direction gradually increases in a direction from the first reinforcing layer 14A toward the third reinforcing layer 14C.

A cap 16 is disposed radially outward of the neck portion 12C of the vessel body 12. The cap 16 has a generally cylindrical shape. The cap 16 is assembled to the neck portion 12C. An outer peripheral surface of the cap 16 serves as an engaging portion 16A including a thread groove (not illustrated). The engaging portion 16A of the cap 16 engages with an engaged portion 18A provided in the connecting member 18.

The connecting member 18 has such a shape as to be attached to the cap 16 thereby closing an opening of the vessel body 12. A recessed portion is provided in one end portion of the connecting member 18 in the axial direction. An inner peripheral surface of the recessed portion serves as the engaged portion 18A to be engaged with the engaging portion 16A of the cap 16. The engaged portion 18A is, for example, an internal thread. The engaged portion 18A may be configured such that, when an external thread serving as the engaging portion 16A of the cap 16 is screwed into engaged portion 18A, the engaged portion 18A is engaged with the engaging portion 16A.

An insertion portion protrudes toward the vessel body 12 from the center of the bottom of the recessed portion provided in the connecting member 18. The insertion portion is inserted into the vessel body 12 with the connecting member 18 assembled to the cap 16. The insertion portion includes a channel 18B.

The connecting member 18 of the present embodiment extends in a direction perpendicular to the axial direction of the vessel body 12. That is, the longitudinal direction of the connecting member 18 coincides with the direction perpendicular to the axial direction of the vessel body 12. The connecting member 18 of the present embodiment is configured such that multiple (i.e., a plurality of) vessel bodies 12 can be connected to each other. That is, the connecting member 18 includes multiple engaged portions 18A arranged in the longitudinal direction of the connecting member 18. The connecting member 18 is configured such that the engaging portions 16A of the caps 16 assembled respectively to the vessel bodies 12 are engaged with the engaged portions 18A.

The channel 18B extends in the longitudinal direction of the connecting member 18. The channels 18B provide communication between internal spaces of the multiple vessel bodies 12. Further, a valve (not illustrated) is attached to the connecting member 18.

Multiple through-holes 18C are provided in the other end portion of the connecting member 18 in the axial direction. Each through-hole 18C extends through the connecting member 18 in the axial direction of the vessel body 12, and has a tapered shape such that the diameter of the through-hole 18C gradually decreases in a direction toward the vessel body 12.

Each through-hole 18C is provided at such a position that the through-hole 18C overlaps with the third reinforcing layer 14C as viewed in the axial direction. In the present embodiment, the multiple through-holes 18C are provided at intervals in the circumferential direction of the connecting member 18 (only two through-holes 18C are illustrated in FIG. 2).

Method of Manufacturing High-Pressure Tank

Next, a method of manufacturing the high-pressure tank 10 of the present embodiment will be described.

First, the vessel body 12 is formed, for example, through press forming (vessel forming step). In one example of the vessel forming step, two metal plates are pressed into semi-cylindrical members, and the two semi-cylindrical members are joined together to form the vessel body 12.

Figure 1:
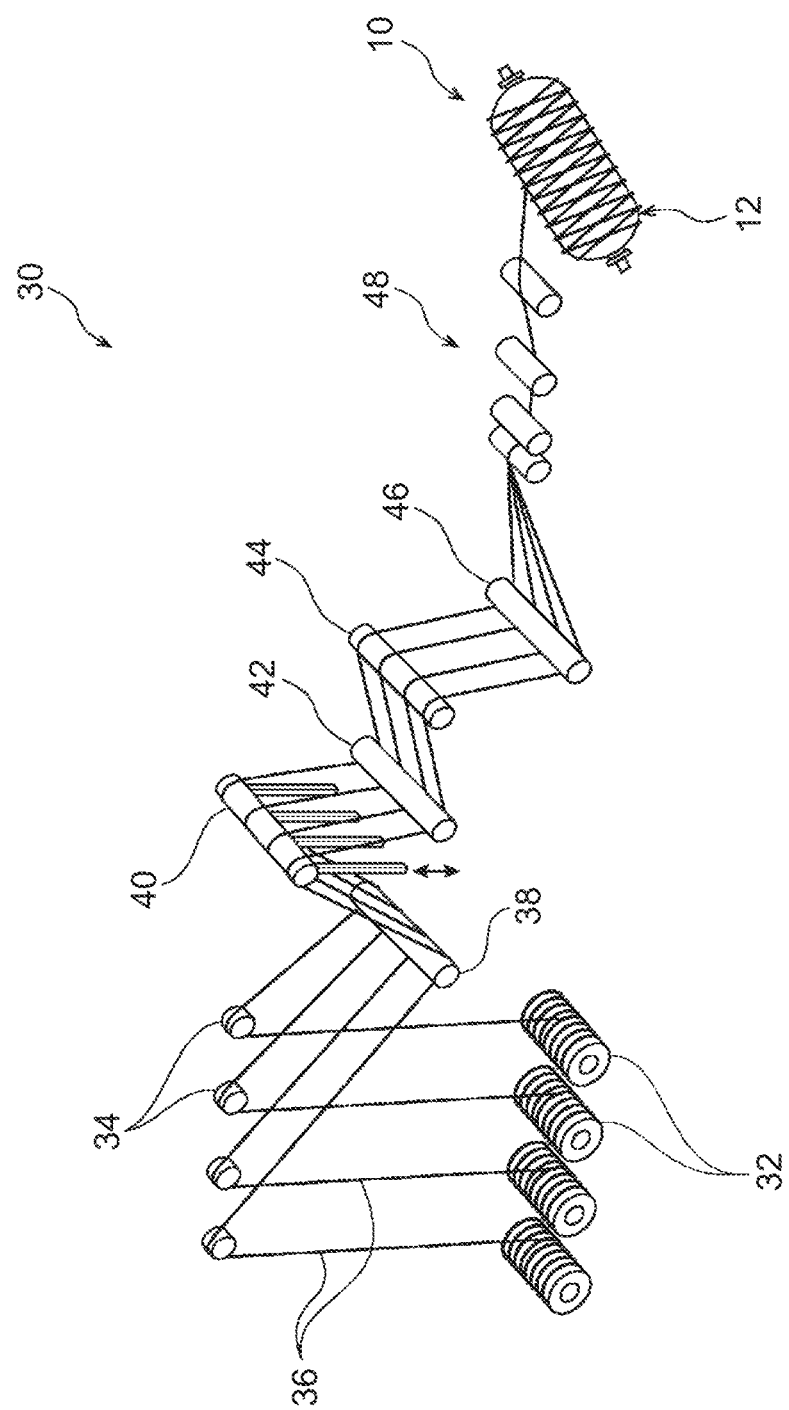
FIG. 1 is an overall configuration diagram illustrating a winding step according to an embodiment.

Then, fibers are wound around the outer peripheral surface of the vessel body 12 (winding step). As illustrated in FIG. 1, the winding step of the present embodiment is performed using a filament winding device 30 (hereinafter, referred to as "FW device 30" where appropriate). The FW device 30 is a device configured to feed fiber bundles 36 at a high speed and wind them around the vessel body 12.

The FW device 30 includes bobbins 32, unwinding rollers 34, a binding roller 38, an active dancer 40, feed rollers 42, 44, 46, and an end roller unit 48.

Multiple bobbins 32 (in the present embodiment, four bobbins 32) are disposed on the most upstream side in the FW device 30. A fiber bundle 36 is wound around each bobbin 32. The fiber bundle 36 is a so-called dry carbon fiber bundle, which is not impregnated with a resin.

The unwinding rollers 34 are disposed respectively above the bobbins 32. In other words, four unwinding rollers 34 are disposed in the present embodiment. The fiber bundles 36 unwound from the bobbins 32 are respectively hung on the unwinding rollers 34. The fiber bundles 36 are fed from the unwinding rollers 34 to the binding roller 38.

The binding roller 38 aligns the fiber bundles 36 unwound from the bobbins 32 and then feeds the aligned fiber bundles 36 to the active dancer 40. The active dancer 40 moves up and down, thereby adjusting the tension of the fiber bundles 36. The fiber bundles 36 with the adjusted tension are fed via the feed rollers 42, 44, 46 to the end roller unit 48.

The four fiber bundles 36 are gathered at the end roller unit 48, where an appropriate pressure is applied to the fiber bundles 36 to adjust the shape of the fiber bundles 36. After the shape of the fiber bundles 36 is adjusted by the end roller unit 48, the fiber bundles 36 are wound around the vessel body 12. In this way, a fiber layer is formed on the outer peripheral surface of the vessel body 12, as illustrated in FIG. 2. Although not illustrated in the drawings, multiple fiber layers are formed on the vessel body 12 so as to be laminated in the radial direction of the vessel body 12.

At this time, the fiber bundles 36 are wound around the vessel body 12 such that the total thickness of the multiple fiber layers is greater on the neck portion 12C than on each of the body portion 12A and the domical portion 12B (see the first reinforcing layer 14A, the second reinforcing layer 14B, and the third reinforcing layer 14C).

After the fiber bundles 36 are wound around the vessel body 12 in the winding step, the cap 16 and the connecting member 18 are assembled to the vessel body 12 (assembling step). Specifically, the cap 16 is assembled to the neck portion 12C of the vessel body 12. Then, the connecting member 18 is assembled to the cap 16. As a result, the connecting member 18 is assembled to the vessel body 12 via the cap 16.

The vessel body 12 to which the cap 16 and the connecting member 18 have been assembled is placed in a mold 50, as illustrated in FIG. 3. Then, a resin is injected into the mold 50 to impregnate the fiber bundles 36 with the resin, whereby the fiber-reinforced resin layer 14 is formed (injection step).

In the injection step, the vessel body 12 is placed at a predetermined position on a lower mold of the mold 50. Then, an upper mold 54 is lifted down. In the present embodiment, a resin injection unit 56 is disposed on one side of the upper mold 54 in the axial direction of the vessel body 12, and the resin injection unit 56 and the upper mold 54 are connected to each other via a pipe 60. Further, a vacuum pump 58 is disposed on the other side of the upper mold 54 in the axial direction of the vessel body 12, and the vacuum pump 58 and the upper mold 54 are connected to each other via a pipe 62.

When the upper mold 54 has been lifted down, a distal end of the pipe 60 extending from the resin injection unit 56 is located at a position corresponding to the connecting member 18 illustrated in FIG. 4. In the injection step, the resin is injected from the resin injection unit 56 through the pipe 60 onto the neck portion 12C of the vessel body 12 in the axial direction. Specifically, the resin is injected in the axial direction from the multiple through-holes 18C of the connecting member 18 into a part of the fiber layers corresponding to the third reinforcing layer 14C, as indicated by arrows in FIG. 4.

As illustrated in FIG. 3, in the injection step, the vacuum pump 58 is operated to depressurize the mold 50 through the pipe 62 while the resin is injected into the fiber layers. In other words, in the injection step of the present embodiment, a vacuum-assisted resin transfer molding (VaRTM) method is implemented to form the fiber-reinforced resin layer 14. With this method, the fiber layers covering the vessel body 12 are impregnated with the resin, whereby the fiber-reinforced resin layer 14 is formed.

Next, the operations of the present embodiment will be described.

According to the method of manufacturing the high-pressure tank 10 of the present embodiment, the vessel body 12 is placed in the mold 50 and then the resin is injected to impregnate the fibers with the resin, in the injection step. As a result, as illustrated in FIG. 4, the fiber-reinforced resin layer 14 is formed on the outer peripheral surface of the vessel body 12. Thus, the vessel body 12 is reinforced by the fiber-reinforced resin layer 14.

In the injection step, the resin is injected in the axial direction onto the neck portion 12C of the vessel body 12. Even when multiple fiber layers are formed on the vessel body 12 so as to be laminated in the radial direction of the vessel body 12 in the winding step, it is possible to impregnate inner fiber layers that are disposed close to the vessel body 12 with the resin. That is, the fibers can be evenly impregnated with the resin.

In the present embodiment, the third reinforcing layer 14C provided on the neck portion 12C is thicker than each of the first reinforcing layer 14A and the second reinforcing layer 14B, as indicated in a region N in FIG. 4. This increases the pressure capacity of the neck portion 12C of the high-pressure tank 10. Even when the fiber layer provided on the neck portion 12C is thick, it is possible to effectively impregnate the fiber layers provided on the neck portion 12C with the resin by injecting the resin in the axial direction into a portion of the fiber layers corresponding to the third reinforcing layer 14C.

In the present embodiment, the connecting member 18 includes the through-holes 18C, and the resin is injected through the through-holes 18C. In this case, it is possible to reliably inject the resin into the fiber layers in the axial direction, as compared with a case where the mold 50 itself includes through-holes for resin injection. For example, the amount of resin to be injected can be adjusted just by changing the shape or hole diameter of each through-holes 18C. Therefore, it is no longer necessary to change design of the mold 50 in order to adjust the amount of resin to be injected.

In the present embodiment, the mold 50 is depressurized by the vacuum pump 58 during the injection step, as illustrated in FIG. 3. This causes bubbles in the resin to expand, and these expanded bubbles are removed by vacuuming. In this way, the bubbles in the resin can be removed. Thus, it is possible to reduce generation of voids in the fiber-reinforced resin layer 14.

While the example embodiment has been described above, various changes and modifications may be made to the foregoing embodiment within the technical scope of the disclosure. For example, the vessel body 12 in the foregoing embodiment includes two domical portions 12B and two neck portions 12C that are provided such that one domical portion 12B and one neck portion 12C are provided at each of both ends of the vessel body 12 in the axial direction.

Alternatively, the vessel body 12 may include the domical portion 12B and the neck portion 12C that are provided at only one end of the vessel body 12 in the axial direction. In this case, the other end of the vessel body 12 in the axial direction may have a closed domical shape.

In the present embodiment, the filament winding device 30 is used to wind the fiber bundles 36 around the outer peripheral surface of the vessel body 12. This is an example of the winding step. However, the method of winding fiber bundles is not limited to this. That is, any methods of winding fibers around the vessel body 12 so as to form multiple fiber layers laminated in the radial direction of the vessel body 12 may be employed.

What is claimed is:

1. A method of manufacturing a high-pressure tank, the method comprising:
    forming a vessel body including a body portion having a cylindrical shape, a domical portion having a hemispherical shape and provided at an end of the body portion, and a neck portion extending from the domical portion in an axial direction of the domical portion;
    winding fibers around an outer peripheral surface of the vessel body to form a plurality of fiber layers laminated in a radial direction of the vessel body;
    placing, in a mold, the vessel body around which the fibers have been wound, and then injecting a resin onto the neck portion in an axial direction of the vessel body to impregnate the fibers with the resin; and
    assembling a cap to the neck portion and assembling a connecting member to the cap, the connecting member being configured to connect a plurality of the high-pressure tanks to each other, wherein
    the connecting member includes a through-hole extending through the connecting member in the axial direction of the vessel body such that the through-hole overlaps with the plurality of fiber layers as viewed in the axial direction of the vessel body when the connecting member has been assembled to the cap, and
    the resin is injected through the through-hole of the connecting member.

2. The method of manufacturing the high-pressure tank according to claim 1, wherein the fibers are wound around the outer peripheral surface of the vessel body such that a total thickness of the plurality of fiber layers is greater on the neck portion than on each of the body portion and the domical portion.

3. The method of manufacturing the high-pressure tank according to claim 1, wherein
    a resin injection unit is disposed on one side of the mold in the axial direction of the vessel body, and a vacuum pump is disposed on the other side of the mold in the axial direction of the vessel body and the vacuum pump is connected to the mold, and
    the mold is depressurized by the vacuum pump while the resin is injected from the resin injection unit into the mold.

4. The method of manufacturing the high-pressure tank according to claim 1, wherein the through-hole has a tapered shape, and a diameter of the through-hole gradually decreases as a distance from the vessel body decreases.

5. The method of manufacturing the high-pressure tank according to claim 1, wherein the connecting member comprises an insertion portion configured to be inserted into the vessel body when the connecting member is attached to the cap.

6. The method of manufacturing the high-pressure tank according to claim 5, wherein the connecting member is configured to connect a plurality of vessel bodies, including the vessel body, and the insertion portion comprises a channel configured to communicate with an internal space of each of the plurality of vessel bodies.

* * * * *